United States Patent
Langhammer et al.

(10) Patent No.: US 10,238,259 B2
(45) Date of Patent: Mar. 26, 2019

(54) METHOD FOR OPERATING A DOMESTIC APPLIANCE SYSTEM

(71) Applicant: Miele & Cie. KG, Guetersloh (DE)

(72) Inventors: Nils Langhammer, Verl (DE);
Friedrich Laube, Guetersloh (DE);
Andre Kersting, Wadersloh (DE);
Florian Benner, Unna (DE); Lars Merkel, Harsewinkel (DE)

(73) Assignee: MIELE & CIE. KG, Guetersloh (DE)

( * ) Notice: Subject to any disclaimer, the term of this patent is extended or adjusted under 35 U.S.C. 154(b) by 812 days.

(21) Appl. No.: 14/840,110

(22) Filed: Aug. 31, 2015

(65) Prior Publication Data

US 2016/0066759 A1 Mar. 10, 2016

(30) Foreign Application Priority Data

Sep. 10, 2014 (DE) ........................ 10 2014 113 040

(51) Int. Cl.
| | | |
|---|---|---|
| *B25J 9/00* | (2006.01) | |
| *A47L 9/28* | (2006.01) | |
| *G08C 17/02* | (2006.01) | |
| *H04W 4/70* | (2018.01) | |
| *H04W 4/80* | (2018.01) | |
| *H04W 76/10* | (2018.01) | |

(52) U.S. Cl.
CPC ............ *A47L 9/2894* (2013.01); *A47L 9/28* (2013.01); *B25J 9/0003* (2013.01); *G08C 17/02* (2013.01); *H04W 4/70* (2018.02); *H04W 4/80* (2018.02); *H04W 76/10* (2018.02); *A47L 2201/00* (2013.01); *Y10S 901/01* (2013.01)

(58) Field of Classification Search
CPC ...... A47L 9/2894; A47L 2201/00; A47L 9/28; H04W 4/70; H04W 4/80; H04W 76/10; G08C 17/02; B25J 9/0003; Y10S 901/01
See application file for complete search history.

(56) References Cited

U.S. PATENT DOCUMENTS

| | | | |
|---|---|---|---|
| 6,459,955 B1 | 10/2002 | Bartsch et al. | |
| 8,533,144 B1 * | 9/2013 | Reeser | G06Q 30/02 |
| | | | 705/14.53 |
| 8,798,834 B2 * | 8/2014 | Jeong | H02J 7/0004 |
| | | | 701/22 |
| 9,860,077 B2 * | 1/2018 | Laurent | H04L 12/282 |
| 2002/0060542 A1 | 5/2002 | Song et al. | |
| 2008/0105134 A1 | 5/2008 | Elston, III et al. | |
| 2009/0082879 A1 * | 3/2009 | Dooley | B25J 9/1658 |
| | | | 700/3 |
| 2012/0310463 A1 * | 12/2012 | Jeong | H02J 7/0004 |
| | | | 701/22 |
| 2014/0166047 A1 | 6/2014 | Hillen et al. | |

(Continued)

FOREIGN PATENT DOCUMENTS

EP 2384680 A 11/2011

*Primary Examiner* — Jason Holloway

(74) *Attorney, Agent, or Firm* — Leydig, Voit & Mayer, Ltd.

(57) ABSTRACT

A method for operating a system of at least one stationary domestic appliance and a mobile domestic appliance includes connecting the mobile domestic appliance using wireless communication to the at least one stationary domestic appliance and exchanging data between the mobile domestic appliance and the at least one stationary domestic appliance.

9 Claims, 2 Drawing Sheets

(56) References Cited

U.S. PATENT DOCUMENTS

| | | | |
|---|---|---|---|
| 2014/0191855 A1* | 7/2014 | Kim | G08C 17/02 340/12.54 |
| 2016/0075034 A1* | 3/2016 | Laurent | H04L 12/282 700/264 |
| 2016/0204953 A1* | 7/2016 | Kim | H04W 4/70 700/275 |
| 2016/0261425 A1* | 9/2016 | Horton | G05B 15/02 |
| 2016/0282862 A1* | 9/2016 | Duffley | G05D 1/0016 |

* cited by examiner

METHOD FOR OPERATING A DOMESTIC APPLIANCE SYSTEM

CROSS-REFERENCE TO PRIOR APPLICATION

Priority is claimed to German Patent Application No. DE 10 2014 113 040.5, filed on Sep. 10, 2014, the entire disclosure of which is hereby incorporated by reference herein.

FIELD

The invention relates to a method for operating a domestic appliance system, in particular a domestic appliance system comprising at least one stationary domestic appliance and one mobile domestic appliance, the mobile domestic appliance being designed to wirelessly send and/or receive data.

BACKGROUND

EP 2 384 680 A, for example, discloses using wireless communication with a mobile domestic appliance in the form of a robotic vacuum cleaner. This document proposes a battery-powered operating apparatus in the form of a remote control which can be carried by a user and by means of which certain pieces of status information, for example the operating time of the robotic vacuum cleaner or the number of filter cleaning cycles, as well as a charge state of the battery carried by the robotic vacuum cleaner, can be retrieved and displayed. US 2002/0060542 A proposes the use of a commercially available personal computer as an interface for wireless communication with a robotic vacuum cleaner with the intention of making it possible to operate the robotic vacuum cleaner via the internet to which the personal computer is connected.

U.S. Pat. No. 6,459,955 B describes an approach which is intended to allow the position of a robotic vacuum cleaner in a room to be determined by means of signal sources located in the room, the signal sources constantly emitting a radio signal which is picked up by the robotic vacuum cleaner by means of a movable antenna, and an angular position with respect to each signal source then being determined on the basis of the respective antenna position.

In the above prior art, at least one additional appliance (operating apparatus, personal computer, signal sources constantly sending out signals) is required in each case either to contact the robotic vacuum cleaner or so that the robotic vacuum cleaner can perform functions such as navigating the room.

SUMMARY

A method for operating a system of at least one stationary domestic appliance and a mobile domestic appliance includes connecting the mobile domestic appliance using wireless communication to the at least one stationary domestic appliance and exchanging data between the mobile domestic appliance and the at least one stationary domestic appliance.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
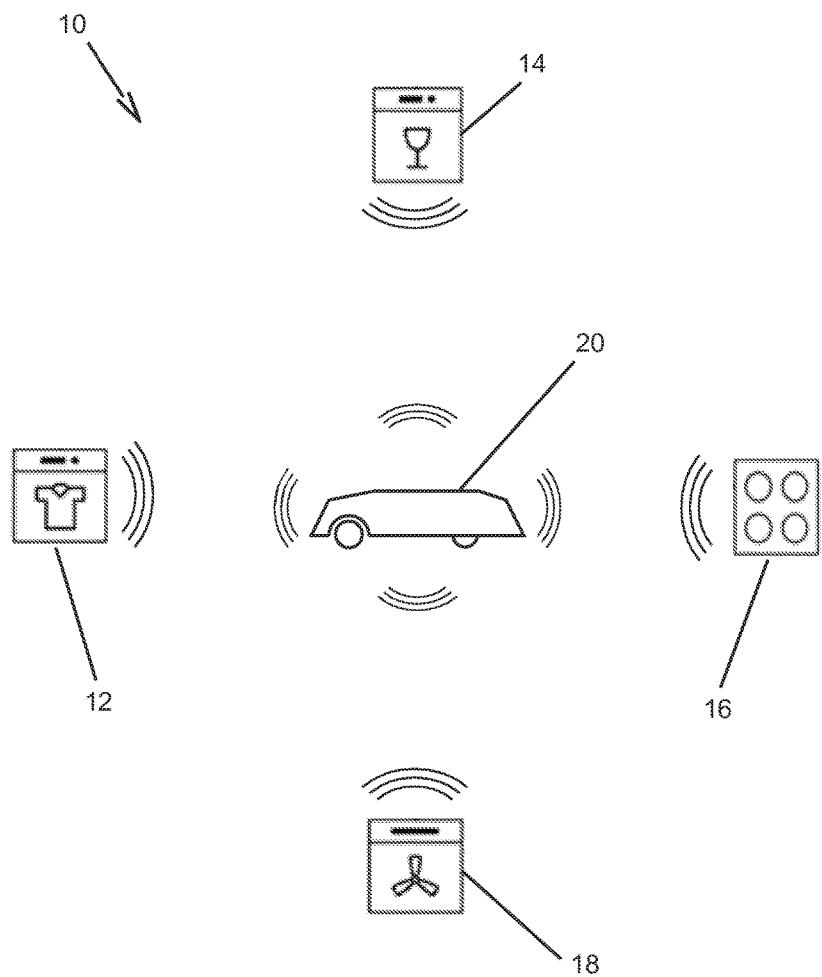
FIG. 1 shows a domestic appliance system comprising a plurality of stationary domestic appliances and a mobile domestic appliance.

In an embodiment, the present invention provides a method for operating a domestic appliance system with at least one stationary domestic appliance and one mobile domestic appliance, in which the mobile domestic appliance is connected for wireless communication to the at least one stationary domestic appliance of the domestic appliance system and in which the mobile domestic appliance and at least one stationary domestic appliance are designed to wirelessly exchange data and to exchange data in this way during operation.

An advantage of the invention is that appliances which normally are already present in a household, i.e. domestic appliances and specifically stationary domestic appliances, such as ovens, refrigerators, hobs, washing machines, tumble dryers and the like, can be used for wireless communication with the mobile domestic appliance, such as a robotic vacuum cleaner for example. There is thus no longer any need for an additional appliance or even a plurality of additional appliances. This reduces costs, but also allows raw materials to be saved and makes things easier for the user of the mobile domestic appliance who can no longer lose or misplace a remote control which was hitherto required, for example, for retrieving a piece of status information about the robotic vacuum cleaner.

In order to improve readability, the following description will continue on the basis of the example of a robotic vacuum cleaner as the mobile domestic appliance, yet without prejudice to the fact that the invention is widely and generally applicable. Accordingly, the general term "mobile domestic appliance" should be understood whenever a robotic vacuum cleaner is mentioned. A conventional vacuum cleaner, i.e. for example a vacuum cleaner in the form of a floor-type vacuum cleaner or the like, or even what is known as a domestic robot is cited in this connection as a further embodiment of such a mobile domestic appliance merely by way of example.

Regarding the data which can be exchanged between the robotic vacuum cleaner and at least one stationary domestic appliance, there are many different possibilities, some of which will be discussed in the following by way of example.

It is accordingly provided in one embodiment of the operating method for the at least one stationary domestic appliance or for one of the stationary domestic appliances of the domestic appliance system to act as a user interface for the robotic vacuum cleaner. Elements and devices which are typically used as user interfaces are thus not required in the robotic vacuum cleaner. This reduces the material and production costs of the robotic vacuum cleaner and the maintenance requirements thereof are also reduced since elements, devices and/or functions that were required until now are no longer present.

In a specific embodiment of the operating method, in which a stationary domestic appliance acts as a user interface for the robotic vacuum cleaner, the robotic vacuum cleaner sends at least one piece of status information to the stationary domestic appliance by way of a wireless communication and the stationary domestic appliance outputs the received piece of status information by means of a display apparatus comprised by the stationary domestic appliance. Display elements and the like can thus be omitted on the robotic vacuum cleaner. In addition, if the stationary domestic appliance has a display apparatus in the form of a screen or a display, further status information or status information containing additional content can be output. For example, reference can be made in this regard to the fact that until now, robotic vacuum cleaners have typically had a display apparatus in the form of an LED or LCD display for indicating a low charge state of the rechargeable battery carried by the robotic vacuum cleaner, and/or had a display apparatus in the form of an LED or LCD display for displaying the fill level. A display apparatus of this type or of a similar type is now no longer necessary on the robotic vacuum cleaner. The charge state and/or the fill level and additional status information can be displayed by means of the display apparatus comprised by the stationary domestic appliance. In the process, the charge state and fill level can for example be displayed at the same time as further status information so that the user can acquire lots of information in a single glance. In addition, the charge state display and/or the fill level display on the display apparatus of the stationary domestic appliance can include additional information, such as a predicted remaining running time on the basis of the charge state and/or a predicted possible remaining operating time on the basis of the fill level of the dust bag or dust collector.

The following are other possible items of status information which can thus be made easily accessible to a user of the robotic vacuum cleaner without increasing the cost of the robotic vacuum cleaner owing to a powerful display apparatus, which can also be damaged during operation of the robotic vacuum cleaner:

- a cleaning progress display, for example in the form of a percentage per room or in relation to the entire living space,
- a display of the time remaining until a room or the entire living space has been cleaned,
- additional information regarding the battery state, such as an estimated remaining life of the battery,
- alarm signals, for example if the robotic vacuum cleaner gets stuck, in particular an alarm signal specified by a piece of location information, such as a predetermined room name, if the robotic vacuum cleaner gets stuck, and
- maintenance and/or servicing information, such as an indication of a need for cleaning or for replacing certain parts of the robotic vacuum cleaner.

In addition to the increased possibilities for displaying status information, the use of a display apparatus of a stationary domestic appliance for displaying status information of the robotic vacuum cleaner is also advantageous in that the user does not have to approach the robotic vacuum cleaner and stoop down thereto or lift said cleaner. Moreover, the robotic vacuum cleaner can continue to operate while individual pieces of status information or a plurality of pieces of status information are being retrieved or displayed, and it can proceed with a cleaning operation or remain in the charging station, for example in order to proceed with or complete a charging operation of the battery.

In an additional or alternative embodiment of the operating method, in which a stationary domestic appliance acts as a user interface for the robotic vacuum cleaner, an operator control action by a user is picked up by means of an operating element comprised by the stationary domestic appliance, and the stationary domestic appliance wirelessly sends an automatically generated piece of control information relating to the operator control action to the mobile domestic appliance.

The robotic vacuum cleaner can thus be operated and/or configured by means of a stationary domestic appliance and an operating element comprised thereby or by means of a plurality of operating elements comprised thereby, without the user having to approach the robotic vacuum cleaner and stoop down thereto or lift said cleaner. In addition, the robotic vacuum cleaner can continue to operate during such an operating process and can continue with its movement, i.e. a vacuuming process for example, or can remain in the charging station, for example in order to proceed with or complete a charging operation of the battery.

When the robotic vacuum cleaner is configured thus by means of wirelessly transmitted data, it may be possible for example to specify cleaning times, a cleaning sequence, a cleaning action or the like. When the robotic vacuum cleaner is operated by means of wirelessly transmitted data, it is possible for example to trigger the cleaning of a particular room or the cleaning of an entire region to be cleaned. In addition, the user can activate a spot clean, in other words specific travel to a particular location to be cleaned. Generally, operating the robotic vacuum cleaner by means of wirelessly transmitted data makes it possible to remotely control the robotic vacuum cleaner in all respects.

In a further embodiment of the operating method, in which the robotic vacuum cleaner exchanges data wirelessly with at least one stationary domestic appliance, it is provided for the at least one stationary domestic appliance or for one stationary domestic appliance of the domestic appliance system to act as a gateway and/or a communication infrastructure for the robotic vacuum cleaner. For this purpose, the stationary domestic appliances and the robotic vacuum cleaner comprise appropriate networking technology. Examples of this are IPv4/IPv6 routing capabilities or meshed networking technologies, such as ZigBee.

If at least one stationary domestic appliance of the domestic appliance system and the robotic vacuum cleaner are designed for wirelessly sending and receiving data, in particular if the stationary domestic appliance acts as a gateway for the robotic vacuum cleaner, various servicing and remote maintenance functions can be carried out on the robotic vacuum cleaner by means of the stationary domestic appliance. For example, a software update can be imported into the robotic vacuum cleaner by means of the stationary domestic appliance. In addition, the robotic vacuum cleaner can indicate results of a self-diagnosis to the stationary domestic appliance, which then proposes, independently or by accessing a server which can be reached for example over the internet, a solution option or a further procedure to the user of the robotic vacuum cleaner. In addition or alternatively, it is thus also possible to additionally provide new cleaning programs or special programs in the memory of the robotic vacuum cleaner, for example a cleaning program provided by a carpet manufacturer for the carpets thereof.

In another embodiment of the operating method, in which the robotic vacuum cleaner exchanges data wirelessly with at least one stationary domestic appliance, it is provided for the mobile domestic appliance to carry out a position determination by means of the data received wirelessly by at least three stationary domestic appliances. The received data relating to the position determination can be data which is transmitted together with or in parallel with other useful data, e.g. control information. The position is determined, for example, on the basis of propagation time measurements or an analysis of the received-signal strengths. In the process, time values as the basis for either a propagation time measurement or the received strength are identified during receipt of a preamble of a data packet comprising the data. This approach can be achieved using a plurality of available short-range radio technologies, e.g. WLAN, Bluetooth or IEEE 802.15.4/ZigBee.

In another additional embodiment of the operating method, in which the robotic vacuum cleaner exchanges data wirelessly with at least one stationary domestic appliance, it is provided for the mobile domestic appliance to monitor its surroundings by means of at least one sensor comprised thereby, in particular a temperature and/or moisture sensor, and, on the basis of the data obtained by the sensor, to switch off a stationary domestic appliance by transmitting a switch-off signal thereto for example, or to inform a user of the robotic vacuum cleaner about a detected exceptional situation. If a sensor is designed as a moisture sensor, the robotic vacuum cleaner can for example detect the spillage of water from a washing machine. The sensor continuously provides a sensor signal during operation of the robotic vacuum cleaner. If the sensor signal exceeds a predetermined or predeterminable threshold, this indicates the presence of water in the movement region of the robotic vacuum cleaner. By means of the communicative connection to the washing machine, the robotic vacuum cleaner can then for example switch off said machine. For this purpose, in one configuration of the robotic vacuum cleaner, the moisture sensor is associated with the washing machine such that the robotic vacuum cleaner can automatically determine the stationary domestic appliance to be controlled in each case on the basis of a respective threshold being exceeded and on the basis of an association of this kind.

In addition, it is possible to link the monitoring of the sensor signal in relation to a threshold with a plausibility check. In this case, when the threshold is exceeded, this for example only causes the washing machine to be switched off when the robotic vacuum cleaner is close to the washing machine (or to the domestic appliance linked to the sensor signal) at the time when the threshold is exceeded. The distance from the domestic appliance or from all the domestic appliances is regularly automatically determined by the robotic vacuum cleaner. It is then possible for the robotic vacuum cleaner to automatically check whether said robotic vacuum cleaner was thus at such a proximity to the washing machine when the threshold was exceeded that the sensor signal can be plausibly attributed to a spillage of water from the washing machine. For this purpose, a check is carried out as to whether the determined distance from the domestic appliance is smaller than a predetermined or predeterminable distance limit. Switching off the domestic appliance or another action relating to the domestic appliance is only triggered when both conditions (threshold being exceeded and distance limit being missed) are met. For this purpose, the configuration of the robotic vacuum cleaner includes, in at least one memory cell, the distance limit, which can optionally be adjusted by the user, or a respective sensor associated with a domestic appliance, since, for example when a washing machine malfunctions, a greater spillage of water has to be dealt with than with a refrigerator.

In addition or alternatively, when individual domestic appliances or all the domestic appliances are monitored automatically by the robotic vacuum cleaner, optionally with the assistance of a plausibility check, it is also provided in a particular embodiment for the robotic vacuum cleaner to automatically generate a message in the event of an exceptional situation detected on the basis of a threshold being exceeded, which message is transmitted for example to a mobile telephone or the like of the user by means of the aforementioned gateway function and/or for the message to be displayed by means of individual display apparatuses or all the display apparatuses of the stationary domestic appliances comprised by the domestic appliance system, such that the user is informed of the exceptional situation in a timely manner.

Overall, the invention thus also relates to a mobile domestic appliance, for example a mobile domestic appliance in the form of a robotic vacuum cleaner, comprising means for carrying out the method described here and in the following, and to a stationary domestic appliance comprising such means and to a domestic appliance system comprising such domestic appliances. The means for carrying out the method are, for example, a control unit having a microprocessor or the like and a memory, in which there is loaded a control programme which can be executed by the microprocessor and comprises an implementation of the respective method steps in software form. The invention thus also relates to a computer program, in particular a control program of this type comprising machine-readable program code instructions and a data carrier on which such a computer program/control program is stored.

An embodiment of the invention is shown in a purely schematic manner in the drawings and will be described in greater detail below. Objects or elements corresponding to one another are provided with the same reference numerals in all the figures. The or each embodiment should not be understood as limiting to the invention. Instead, amendments and modifications are also possible within the scope of the present disclosure, in particular variants and combinations of the type which can be inferred by a person skilled in the art with regard to solving the problem by, for example, combining or amending individual features and elements or method steps in conjunction with all those described in the general or specific description and contained in the claims and/or the drawings, and which lead to new subject matter by way of combinable features.

FIG. 1 shows a schematically greatly simplified domestic appliance system 10, which will sometimes also be referred to in the following in short as system 10. The system 10 comprises at least one stationary domestic appliance 12 (for example, four domestic appliances 12, 14, 16, 18 in the scenario shown), specifically a washing machine 12, a dishwasher 14, a hob 16 and an oven 18, as well as a mobile domestic appliance 20. The mobile domestic appliance 20 is shown by way of example as a robotic vacuum cleaner 20 and the following description continues with the example of a robotic vacuum cleaner 20 as a mobile domestic appliance 20, without prejudice to the fact that the invention is widely and generally applicable. Instead of the aforementioned domestic appliances 12-18, other domestic appliances are also possible. However, the type of the domestic appliance 12-18 in each case is of little importance and so general reference is made to such appliances as domestic appliances 12-18 in the following and any type of domestic appliance is to be understood thereby.

The mobile domestic appliance 20, so in this case the robotic vacuum cleaner 20, is connected for wireless communication to at least one stationary domestic appliance 12-18 of the system 10. This is shown in the illustration in FIG. 1 by the wavefronts originating from the individual appliances 12-18, 20. Means for establishing a wireless communicative connection between two or more appliances are known per se in the form of appropriate transmission and/or receiving apparatuses.

Owing to the wireless communicative connection between the robotic vacuum cleaner 20 and one of the domestic appliances 12-18 or the plurality of domestic appliances 12-18, the mobile domestic appliance 20 and at least one stationary domestic appliance 12-18 can exchange data. It goes without saying that there is no need for the robotic vacuum cleaner 20 (as shown in the schematically simplified illustration in FIG. 1) to be located between all the domestic appliances 12-18 comprised by the domestic appliance system 10. In addition, obstacles (which are not shown in FIG. 1 either) such as kitchen fittings or room furnishings can be located between a stationary domestic appliance 12-18 and the robotic vacuum cleaner 20 without the wireless communicative connection between the respective stationary domestic appliance 12-18 and the robotic vacuum cleaner 20 being affected as a result.

Figure 2:
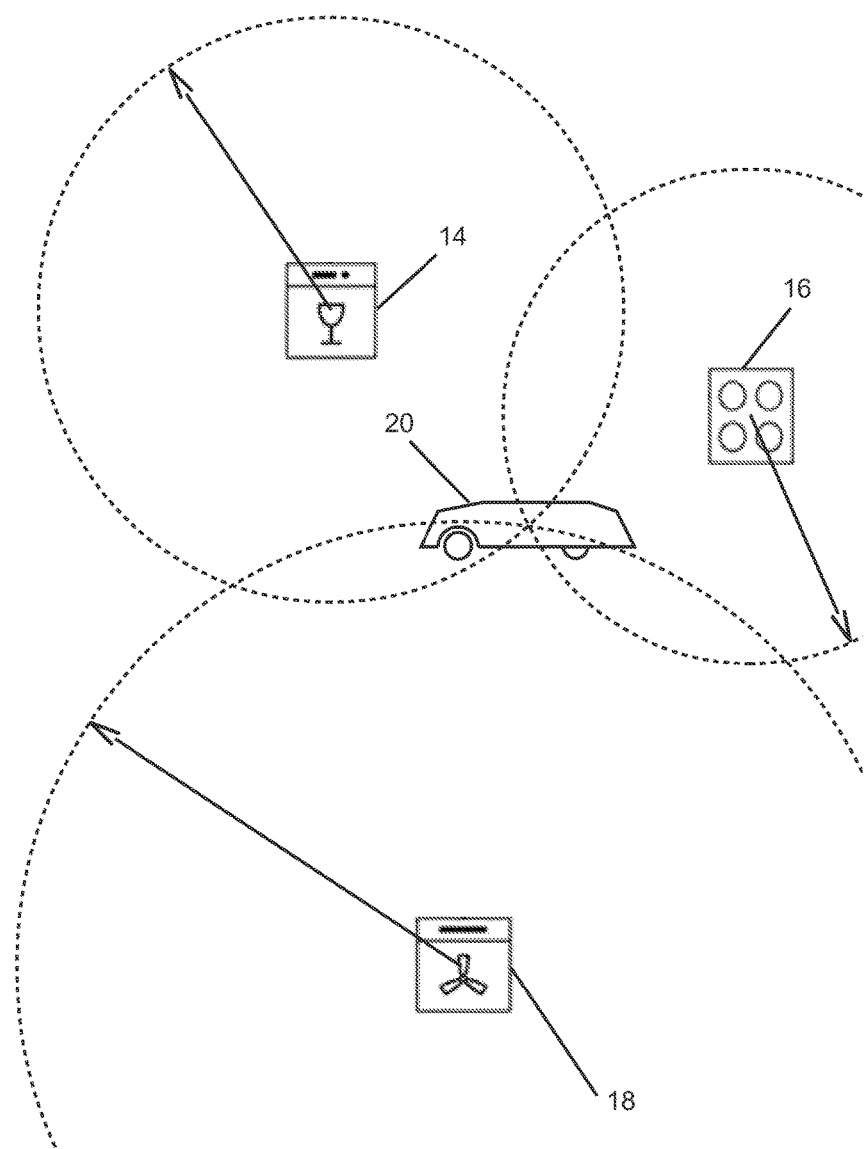
FIG. 2 shows an application scenario for a domestic appliance system, in which the mobile domestic appliance is connected for wireless communication to individual stationary domestic appliances.

The illustration in FIG. 2 shows, in a schematically simplified form, the position determination of the robotic vacuum cleaner 20 by means of known positions of individual stationary domestic appliances 12-18. The robotic vacuum cleaner 20 detects a distance from the respective domestic appliance 12-18, for example on the basis of a signal propagation time of a data packet transmitted by a stationary domestic appliance 12-18 to the robotic vacuum cleaner 20. In the illustration in FIG. 2, the distances are indicated by the arrows each originating from one of the domestic appliances 12-18 and marked in a circle around the domestic appliance 12-18.

On the basis of at least three thus determined distances from a respective stationary domestic appliance 12-18 and on the basis of the position of the respective domestic appliances 12-18, the robotic vacuum cleaner 20 can determine its position in the room by means of a control unit comprised thereby. In the process, the stationary domestic appliances 12-18 are considered to be fixed reference points and are used as anchor nodes for determining the position of (locating) the robotic vacuum cleaner 20. By means of the control unit comprised by the robotic vacuum cleaner 20, the position of the robotic vacuum cleaner 20 is automatically determined using triangulation algorithms for example, which are fundamentally known per se. Alternatively, it can also be provided for the position of the robotic vacuum cleaner 20 to be determined by means of a control unit comprised by one of the stationary domestic appliances 12-18 and to then be transmitted wirelessly to the robotic vacuum cleaner 20.

The determined positional information can be used, for example, to correct a piece of positional information obtained in a different manner, for example a piece of positional information tracked on the basis of the movement of the wheels of the robotic vacuum cleaner 20 after leaving the charging station. Additionally or alternatively, the determined positional information can also be used to detect and/or transmit vacuuming parameters specific to the room and/or position. These include, for example, information regarding the frequency with which a room, a portion of a room or a position in the room is cleaned, this information being detected, for example, for static purposes, or information regarding a floor covering provided at a particular position, this information being transmitted wirelessly to the robotic vacuum cleaner 20, whereupon said robotic vacuum cleaner automatically adapts the vacuuming mode to the respective floor covering.

The approach described here allows domestic appliances 12-18 which are already present in a house, in particular stationary domestic appliances 12-18, to be used for the first time to operate a mobile domestic appliance 20. In this context, the term "operate" is to be interpreted broadly, in particular on the basis of the above-described examples, and the operation which is now possible is based on bi-directional wireless communication between a mobile domestic appliance 20, for example a robotic vacuum cleaner 20, and at least one stationary domestic appliance 12-18.

In addition, the approach described here for example makes an operating mode possible in which, by means of sensors comprised by the robotic vacuum cleaner 20, for example distance sensors or contact sensors, said cleaner senses changes in the room being worked in in each case. If the user of the robotic vacuum cleaner 20 uses one of the domestic appliances 12-18 to specify that he will be absent for a relatively long period of time, while the user is away the robotic vacuum cleaner 20 checks during the vacuuming operation whether changes have occurred to the spatial surroundings. If the robotic vacuum cleaner 20 detects such a change by means of its sensor system, it is possible to conclude that an unauthorised entry has taken place. The robotic vacuum cleaner 20 then generates a message in this regard. This is first transmitted wirelessly by the robotic vacuum cleaner 20 to one of the stationary domestic appliances 12-18, from where the message is forwarded, for example over the internet or to an appliance connected to the internet, for example a personal computer located in the house. In any case, the message which was originally generated by the robotic vacuum cleaner 20 as a result of the detected changes to the spatial surroundings and which was transmitted within the house by the robotic vacuum cleaner 20 to at least one of the stationary domestic appliances 12-18 is forwarded to the user, so that said user can take appropriate measures.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 system, domestic appliance system
12 stationary domestic appliance (washing machine)
14 stationary domestic appliance (dishwasher)
16 stationary domestic appliance (hob)
18 stationary domestic appliance (oven)
20 mobile domestic appliance (robotic vacuum cleaner)

What is claimed is:

1. A method for operating a domestic appliance system comprising at least one stationary domestic appliance selected from the group comprising an oven, a refrigerator, a hob, a washing machine, and a tumble dryer, and a robotic vacuum cleaner as a mobile domestic appliance, the at least one stationary domestic appliance and the mobile domestic appliance each comprising short-range radio technology, the method comprising:
   connecting the mobile domestic appliance using the short-range radio technology to the at least one stationary domestic appliance;
   exchanging data between the mobile domestic appliance and the at least one stationary domestic appliance,
   wherein the mobile domestic appliance monitors its surroundings using at least one sensor, the at least one sensor comprising at least one of a temperature sensor or a moisture sensor, the at least one sensor being associated with the at least one stationary domestic appliance, and
   wherein the mobile domestic appliance switches off the at least one stationary domestic appliance when an output signal from the at least one sensor exceeds a predetermined threshold.

2. The method of claim 1, further comprising using the at least one stationary domestic appliance as a user interface for the mobile domestic appliance.

3. The method of claim 2, wherein the mobile domestic appliance sends a piece of status information to the at least one stationary domestic appliance, and further comprising the at one stationary domestic appliance outputting the received piece of status information by a display apparatus of the at least one stationary domestic appliance.

4. The method of claim 2, further comprising picking up an operator control action using an operating element comprising the at least one stationary domestic appliance and wherein the at least one stationary domestic appliance sends an automatically generated piece of control information relating to the operator control action to the mobile domestic appliance.

5. The method of claim 1, wherein the at least one stationary domestic appliance or the stationary domestic appliance is configured to act as a gateway for the mobile domestic appliance.

6. The method of claim 1, wherein the at least one stationary domestic appliance comprises at least three stationary domestic appliances, and the mobile domestic appliance carries out a position determination using data received wirelessly by the at least three stationary domestic appliances.

7. The method of claim 1, further comprising monitoring the predetermined threshold together with a distance-related plausibility check.

8. A mobile domestic appliance configured to carry out a method for operating a domestic appliance system comprising at least one stationary domestic appliance selected from the group comprising an oven, a refrigerator, a hob, a washing machine, and a tumble dryer, the at least one stationary domestic appliance and the mobile domestic appliance each comprising short-range radio technology, the method comprising:
   connecting the mobile domestic appliance using the short-range radio technology to the at least one stationary domestic appliance;
   exchanging data between the mobile domestic appliance and the at least one stationary domestic appliance,
   wherein the mobile domestic appliance monitors its surroundings using at least one sensor, the at least one sensor comprising at least one of a temperature sensor or a moisture sensor, the at least one sensor being associated with the at least one stationary domestic appliance,
   wherein the mobile domestic appliance switches off the at least one stationary domestic appliance when an output signal from the at least one sensor exceeds a predetermined threshold, and
   wherein the mobile domestic appliance comprises a robotic vacuum cleaner.

9. A domestic appliance system, comprising:
   at least one stationary domestic appliance; and
   at least one mobile domestic appliance,
   wherein the at least one stationary domestic appliance and the at least one mobile domestic appliance are configured to carry out a method for operating the domestic appliance system, the at least one stationary domestic appliance being selected from the group comprising an oven, a refrigerator, a hob, a washing machine, and a tumble dryer, and the at least one mobile domestic appliance comprising a robotic vacuum cleaner, the at least one stationary domestic appliance and the at least one mobile domestic appliance each comprising short-range radio technology, the method comprising:
      connecting the at least one mobile domestic appliance using the short-ranqe radio technology to the at least one stationary domestic appliance;
      exchanging data between the at least one mobile domestic appliance and the at least one stationary domestic appliance,
      wherein the at least one mobile domestic appliance monitors its surroundings using at least one sensor, the at least one sensor comprising at least one of a temperature sensor or a moisture sensor, the at least one sensor being associated with the at least one stationary domestic appliance, and
      wherein the at least one mobile domestic appliance switches off the at least one stationary domestic appliance when an output signal from the at least one sensor exceeds a predetermined threshold.

* * * * *